INVENTOR.
HERMANN NEUHAUS

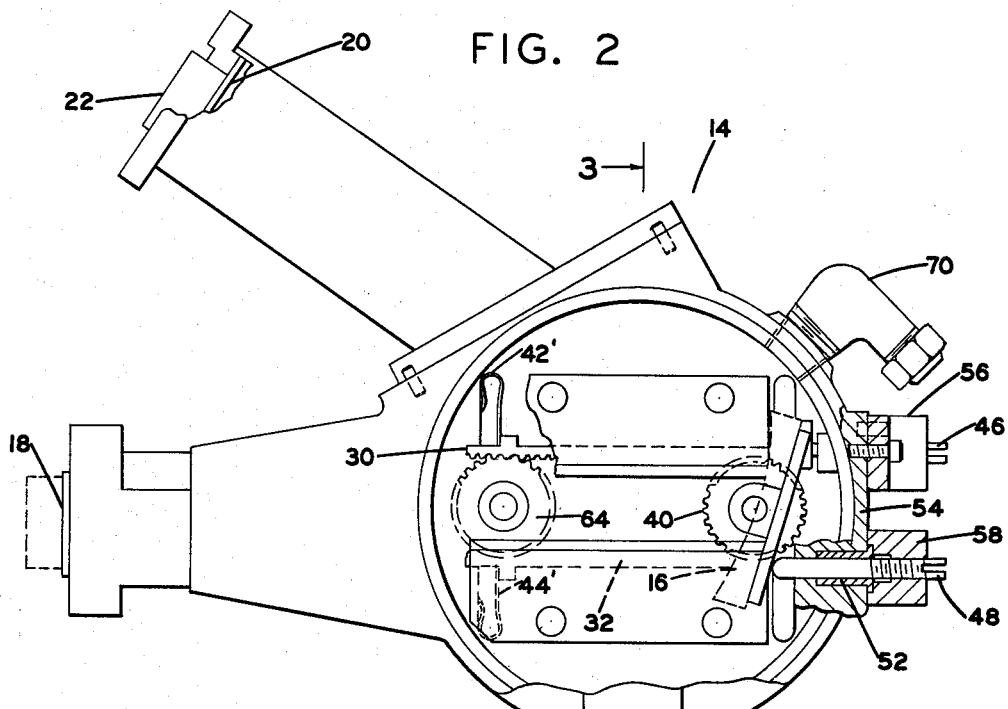
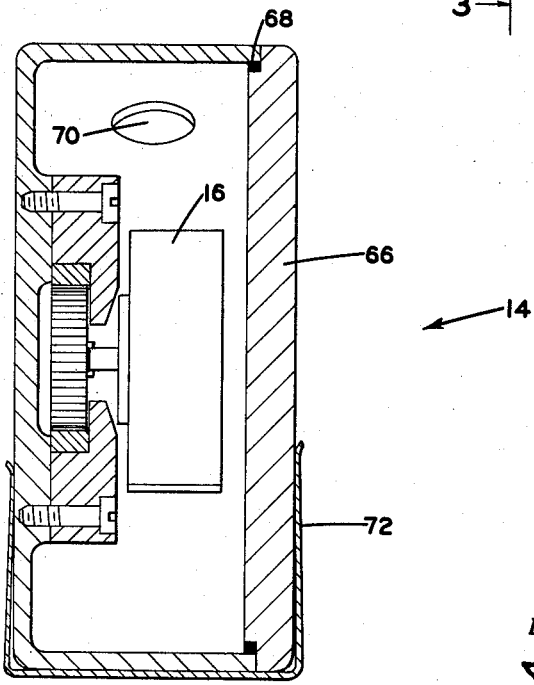

United States Patent Office 3,153,144
Patented Oct. 13, 1964

3,153,144
POSITION ADJUSTMENT MECHANISM AND
X-RAY SPECTROMETER INCLUDING IT
Hermann Neuhaus, Montrose, Calif., assignor to Applied Research Laboratories, Inc., Glendale, Calif., a corporation of Delaware
Filed Feb. 3, 1961, Ser. No. 86,962
4 Claims. (Cl. 250—51.5)

This invention relates to a novel position adjustment mechanism and to a novel X-ray spectrometer including it.

One important object of the present invention is to provide a novel, relatively simple and inexpensive, yet sensitive position adjustment mechanism for adjusting the position of a member both angularly and linearly along a selected path.

Other objects are: to provide a novel mechanism of this type which is especially suited for adjusting the position of a member enclosed within an evacuated chamber such as, for example, a focusing crystal in a vacuum X-ray spectrometer; to provide a novel X-ray spectrometer useful over a selected portion of the X-ray spectrum and capable of precise adjustment for measuring the intensities of X-rays at any pre-selected wave length within the range of the spectrometer; to provide a novel X-ray spectrometer of this type including a novel adjustment mechanism for selectively positioning the diffracting element of the spectrometer both in rotation and rectilinearly, thereby to adjust the spectrometer to respond to the particular wave length of X-rays it is desired to detect or to measure; and in general, to provide a novel position adjustment mechanism including relatively few, easily manufactured parts, which is simple to operate, and dependable, rugged, and long-lasting in service.

The foregoing and other objects and advantages of the invention will become apparent in the following detailed description of a presently preferred embodiment thereof, taken in conjunction with the drawings wherein:

FIG. 2 is a side elevational view of the spectrometer with its cover removed; and FIG. 3 is a cross sectional view taken along the line 3—3 of FIG. 2.

Figure 1:
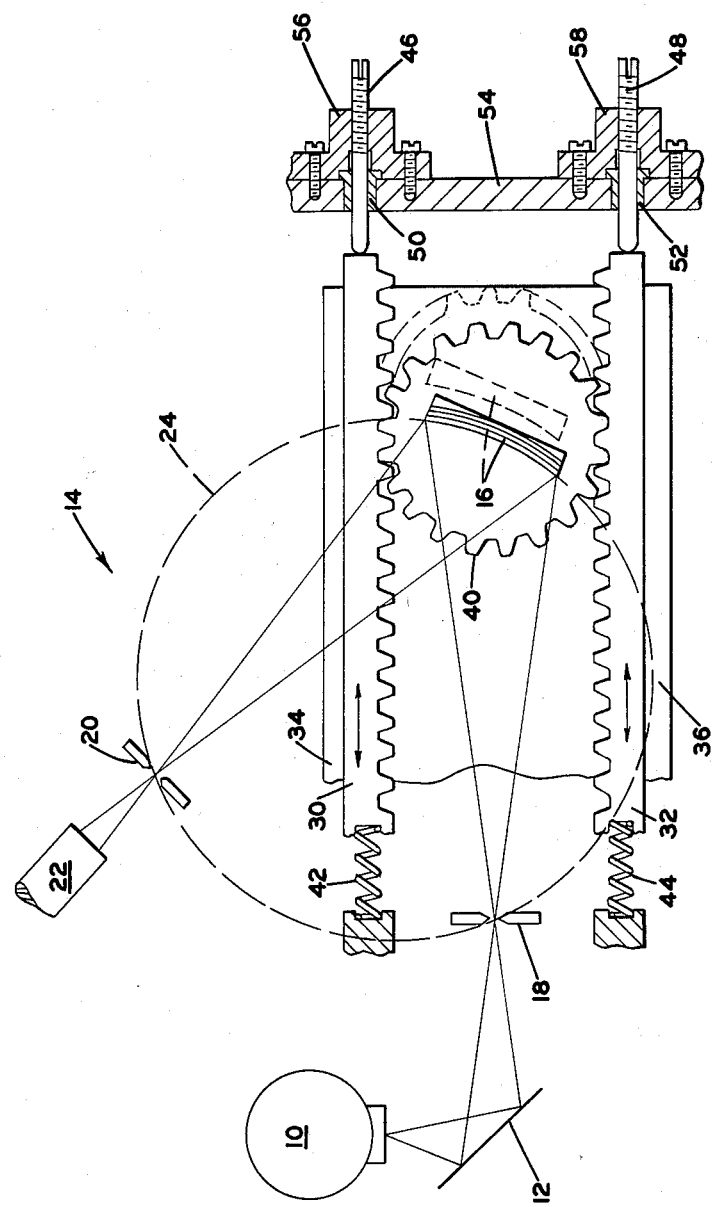
FIG. 1 is a schematic diagram of an X-ray spectrometer including a position adjustment mechanism according to the present invention.

Briefly, the adjusting mechanism of the invention includes a gear retained between two opposed racks and in mesh with both of them. The member it is desired to adjust is fixed to the gear. The racks are slidable parallel to each other in fixed guideways, and drive means are included for controllably and selectively moving the racks, thereby to drive the gear in translation or rotation, or both, as desired.

The arrangement has been found to be especially advantageous for use in devices such as the X-ray spectrometer shown in the drawings, which is mounted within a housing and intended for operation in a high vacuum where lubrication problems are relatively difficult. Instruments of this type require relatively sensitive adjustment means capable of achieving precisely controlled, relatively small adjustments of position with a relatively high degree of accuracy. The mechanism of the present invention satisfies these requirements and, moreover, is relatively simple in construction, requiring a minimum number of parts and using only parts that can be made relatively inexpensively with the required relatively high precision.

Referring now to the drawings, the spectrometer 14 shown therein is of the so-called fixed wave length type, being adjustable over a relatively limited part of the X-ray spectrum. The spectrometer 14 is shown in FIG. 1 as arranged for measuring X-ray radiation emitted by a test speciment 12 in response to irradiation by primary X-rays emerging from an X-ray generator 10. The spectrometer 14 is of the curved crystal focusing type, and includes a diffracting crystal 16, which concentrates X-rays received by it from a primary slit 18 upon a secondary slit 20. The X-rays emerging from the secondary slit 20 impinge upon a detector 22, which may be a Geiger-Müller tube, a scintillation counter, or any other desired X-ray sensitive device arranged for providing a sensible indication of the X-ray intensity.

Now, for X-rays of any given wavelength, the angle between the crystal 16 and the X-rays impinging on it (the angle of incidence) is equal to the angle between the crystal 16 and the X-rays diffracted from it (the angle of diffraction). Ordinarily, X-rays of various different wavelengths enter through the primary slit 20 and impinge on the crystal 16. Thus, the angular position of the crystal 16 relative to the slits 18 and 20 determines the wavelength of the X-rays focused by the crystal 16 at the secondary slit 20. This follows in accordance with the well known Bragg law, which is usually stated, $$n\lambda = 2d \sin \theta$$

where $n$ is an integer, $\lambda$ is the wavelength of the X-rays diffracted to the secondary slit, $d$ is the diameter of the focal circle 24, and $\theta$ is the angle of incidence or diffraction.

Relatively small changes in position of the crystal 16 will effect significant changes in the wavelength of the X-rays passing through the secondary slit 20. The position adjustment mechanism of the invention is well adapted for controllably effecting relatively small changes in the position of the crystal 16, and includes pair of racks 30 and 32 mounted in opposition to each other and smoothly slidable along respective ways 34 and 36. The crystal 16 is fixed upon a gear 40, which is retained between the racks 30 and 32 in mesh with both of them. The racks 30 and 32 are biased to the right as viewed in FIGS. 1 and 2 by compression springs 42 and 44, respectively, and are drivable against the springs by screws 46 and 48. The front, non-threaded portions of the screws 46 and 48 extend through sealing bushings 50 and 52, respectively, in the vacuum wall 54 of the spectrometer housing. The threaded portions of the screws 46 and 48 are engaged in nuts 56 and 58, respectively, which are fixed exteriorly to the housing wall 54.

When the two screws 46 and 48 are rotated equally in the same direction, both screws being the same pitch, the racks 30 and 32 are driven equal distances in the same direction, and the gear 40, together with the crystal 16, moves in translation parallel to the racks. When the screws 46 and 48 are rotated equally in opposite directions, the gear 40 will rotate without rectilinear motion. Any other adjusting motion of the screws 46 and 48 will produce both rectilinear motion and rotation of the gear 40.

The change in adjustment of the spectrometer in terms of wavelength shift can be shown to be directly proportional to the sum of the rotations of the adjustment screws 46 and 48, taking the direction of rotation into account by use of the proper mathematical sign. The expression is as follows:

$$\Delta\lambda = \frac{RTd^2 \cos \theta \sin 2\theta}{sn^2\lambda} \times 10^{-3}$$

or $$T = \frac{sn^2\lambda\Delta\lambda}{Rd^2 \cos \theta \sin 2\theta} \times 10^3$$

where:

$$T = \frac{T_1 + T_2}{2}$$

$T_1$ is the number of turns of one screw in the clockwise direction $T_2$ is the number of turns of the second screw in a clockwise direction R is the radius of the focal circle s is the lead of the adjustment screws 46 and 48, and $\theta$, n, and $\lambda$ are the same as in the Bragg law expression These formulae hold true for relatively small variations of the position of the crystal 16 after the crystal has been mechanically assembled in its nominally calculated location in the spectrometer.

In the spectrometer shown in FIG. 2, an auxiliary gear 64 is retained between the racks 30 and 32 spaced from the crystal mounting gear 40 in order to keep the racks 30 and 32 properly spaced apart, and to permit the use of relatively simple, open guideways for the racks. Also, leaf springs 42' and 44' are used for biasing the racks 30 and 32 instead of the coil springs illustrated schematically in FIG. 1.

In operation, a cover plate 66 is sealed by an O-ring 68 to the housing, which may then be evacuated through a nipple 70 when it is desired to use the spectrometer for measuring the so-called soft X-rays. Adjustment of the crystal position may then be made by manipulating the screws 46 and 48 in the manner hereinabove described. A simple spring clip 72 may be used to secure the cover 66 upon the housing during times when the housing is not evacuated.

What is claimed is:

1. Mechanism for position adjustment of a diffraction element in spectroscopic apparatus comprising a gear, means for fixing the element upon said gear, a pair of opposed parallel racks meshing with said gear, and means for controllably and selectively driving said racks in translation thereby to adjust the position of said gear and the diffraction element thereon both angularly and rectilinearly as desired.

2. Position adjustment mechanism for controllably positioning a diffraction element in spectroscopic apparatus comprising a gear for mounting the diffraction element, a pair of parallel ways extending in the plane of said gear and on opposite sides thereof, a pair of racks slidable in said ways and meshing with said gear, biasing means for yieldably urging said racks in one direction along said ways, and drive means for controllably and selectively driving said racks against said biasing means thereby to adjust the position of said gear and a diffraction element mounted thereon both angularly and rectilinearly as desired.

3. Position adjustment mechanism for controllably positioning a diffraction element in spectroscopic apparatus comprising a first gear for carrying the diffraction element, a pair of parallel ways extending in the plane of said gear on opposite sides thereof and facing each other, a pair of racks slidable along said ways and meshing with said gear, a second gear spaced from said first gear and also meshing with said racks and in conjunction with said first gear for retaining said racks in engagement with said ways, and means for controllably and selectively driving said racks in translation thereby to adjust the position of said first gear and the diffraction element carried thereon both angularly and rectilinearly as desired.

4. An adjustable X-ray spectrometer comprising an evacuatable housing, a pair of parallel opposed ways fixed within said housing, a pair of opposed racks slidable in said ways, a gear mounted between and in mesh with said racks, a curved X-ray diffracting crystal fixedly mounted on said gear, springs for biasing said racks in one direction along said ways, and a pair of drive screws sealingly extending through a wall of said housing and at their inner ends abuttingly engaging respective ones of said racks, whereby rotation of said drive screws effects selective and controllable motion of said racks for driving said gear and said crystal mounted thereon angularly and rectilinearly as desired.

References Cited in the file of this patent
UNITED STATES PATENTS

| | | |
|---|---|---|
| 2,338,271 | Ulanet | Jan. 4, 1944 |
| 2,543,630 | Hansen | Feb. 27, 1951 |
| 2,635,192 | Cordovi | Apr. 14, 1953 |
| 2,691,295 | Zeiger | Oct. 12, 1954 |
| 2,859,628 | Arko | Nov. 11, 1958 |
| 2,924,715 | Henden et al. | Feb. 9, 1960 |
| 3,040,717 | Rumsey | June 26, 1962 |